sentially comprises an OR gate 40 and a switch 42. The manually actuated switch 42 is adapted to connect the input of the scaler 38 either to the output of gate 36 or to the output of the OR gate 40. The two inputs of the OR gate are fed by the linear gates 36 and 36'. When the switch is in the position illustrated in FIG. 3, the scaler 38 receives the pulses from the first and second channels whose energy windows are so adjusted that they correspond to ranges A and B of FIG. 1.

Numerous modifications may be made: In order to extend the range of operation, it may be advantageous to sum the contents of three counting channels, A, B and C. The principles of system construction remains unchanged excepting that a tree input OR gate replaces the two input gate previously described. The complexity of instrument setup is increased and therefore this mode of operation is not recommended unless it becomes absolutely necessary.

MOre generally, it will be apparent to those skilled in the art that the device of the invention may be constructed in a variety of ways without departing from the scope and spirit of the appended claims.

I claim:

1. A process of liquid scintillation counting at substantially the same counting efficiency of a plurality of samples exhibiting different amounts of quenching and containing the same beta-emitting isotope, the pulse height spectrum of said samples exhibiting a substantial shift upon quenching, comprising the steps of: converting the decay events of each sample to pulses varying in amplitude with the energy of the corresponding decay events, counting the pulses in a first pulse height range, the upper limit of which corresponds to the upper limit of the pulse height spectrum that would be exhibited by one of said samples having the maximum expected amount of quenching, and counting the pulses in a second pulses height range selected so that the sum of the counting rates in said first and second ranges that would be produced by one of said samples having the minimum expected amount of quenching is equal to the sum of the counting rates in said first and second ranges that would be produced by one of said samples of the same activity as the sample having the minimum expected amount of quenching but having said maximum expected amount of quenching.

2. A process for liquid scintillation counting as recited in claim 1 further comprising summing the counts for each sample in said first and second ranges.

3. A process for liquid scintillation counting as recited in claim 1 wherein said second range is selected to extend from the greatest pulse height that would be produced by a sample exhibiting said minimum expected amount of quenching to a pulse height selected so that the sum of the count rates in said first and second ranges for the sample exhibiting said minimum amount of quenching is equal to the count rate in said first range for the sample of the same activity as the same having the minimum expected amount of quenching but exhibiting said maximum amount of quenching.

4. A process according to claim 2, wherein said isotope is $^{14}C$ or a more energetic isotope.

5. The process for counting at substantially the same counting efficiency decay events of a plurality of samples of beta emitting isotopes exhibiting different amounts of quenching, said samples containing the same beta-emitting isotope, the energy spectrum of said samples as detected exhibiting a substantial shift upon quenching, comprising the steps of: converting the decay events of each sample to signals having a characteristic varying with the energy of the corresponding decay events, counting with signals the said characteristic of which falls in a first range, the upper limit of which corresponds to the upper limit of the spectrum that would be exhibited by one of said samples having the maximum expected amount of quenching, and counting the signals the said characteristic of which falls into a second range selected so that the sum of the counting rates in said first and second ranges that would be produced by one of said samples having the minimum expected amount of quenching is equal to the sum of the count rates in said first and second ranges that would be produced by a sample of the same activity as the sample having the minimum expected amount of quenching but having said maximum expected amount of quenching.

6. A liquid scintillation spectrometry system for measuring at substantially constant counting efficiency the activity levels of a plurality of samples labeled with a same beta emitter exhibiting a substantial spectral shift upon quenching, comprising: means for converting light energy from beta events into electrical pulses and for amplifying said pulses, a first discriminator channel for passing only a first predetermined height range of said pulses extending downward from substantially the upper energy level of the most quenched sample expected in said plurality, a second discriminator channel for passing only a second predetermined height range of said pulses extending downward from the upper energy level of the least quenched sample expected in said plurality, the lower energy levels of said ranges being so selected that the counts are substantially equal for said expected samples of the same activity exhibiting said least and maximum amount of quenching.

7. A liquid scintillation spectrometry system as recited in claim 6 wherein there is provided means for recording the added counts in said first and second ranges.

8. A liquid scintillation spectrometry system as recited in claim 6 wherein the lower end of the range of said first pulse height discriminator is set so that such range corresponds to substantially the entire pulse height spectrum of the most quenched sample expected in said plurality.

9. The process counting at substantially the same efficiency decay events of a plurality of samples of beta emitting isotopes, said samples exhibiting different amounts of quenching and containing the same beta emitting isotope, the energy spectrum of said samples as detected exhibiting a substantial shift upon quenching, comprising the steps of: converting the decay events of each sample to signals having a characteristic varying in accordance with the energy of the corresponding decay events, and counting the signals the said characteristic of which falls in each of a plurality of ranges, the upper limit of a first one of said ranges being selected to correspond to the upper limit of the entire energy range which would be exhibited by one of said samples having the maximum expected amount of quenching, the remaining of said ranges being selected so that the sum of the counting rates in all of said plurality of ranges that would be produced by one of said samples having the minimum expected amount of quenching is equal to the counting rate in said first one of said ranges that would be produced by one of said samples of the same activity as the sample having the minimum expected amount of quenching but having said maximum expected amount of quenching.

PATENTED OCT 5 1971  3,610,929
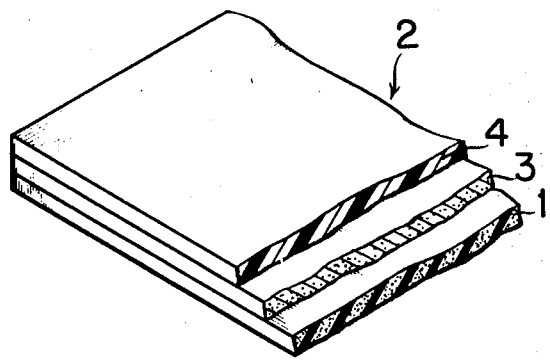
Masaaki Fujimoto
Shizuo Hayashi
INVENTORS
BY George B. Oujevolk
Attorney

3,610,929

ANTISTATIC FLUORESCENT SCREEN FOR RADIOGRAPHY

BACKGROUND OF THE INVENTION

The present invention relates to improvements in an antistatic fluorescent screen for radiography. The so-called fluorescent screen, for example, an intensifying screen applied in radiography using radiations such as X-rays, gamma-rays, etc. or a fluorescent screen employed in indirect radiography and fluoroscopy generally consists of a substrate made of paper, plastic sheeting or the like which is coated with a fluorescent layer capable of emitting luminescence upon excitation by radiations. And in many cases, the surface of the fluorescent layer is covered with a protective layer made of transparent plastic film.

For the aforementioned purpose, the substrate of a fluorescent screen should preferably absorb very little radiation and have sufficient mechanical strength, dimensional stability, resistance to contamination and light impermeability.

Among the plastics which have been increasingly manufactured in recent years there are indeed many kinds which substantially satisfy the aforesaid conditions demanded by the substrate. However, the plastics generally have high-dielectric properties so that when subjected to friction or other treatment during handling, they are often disadvantageously charged statically and what is worse, the results of such static charge are retained relatively long. The voltage of such static charge sometimes amounts to from hundreds or thousands of volts to more than ten thousand volts, resulting in the following difficulties.

If a plastic substrate is statically charged during the process of manufacturing a fluorescent screen, it will absorb dust and present stains to degrade the quality of product. Further when the substrate is coated with a past of fluorescent material, the solvent vapor may be ignited by discharge sparks resulting from such coating, leading to the danger of an explosion taking place.

A fluorescent screen whose substrate consists of readily chargeable plastics is statically charged during handling, for example, the insertion and withdrawal of X-ray films, and the static energy thus accumulated is discharged to present what is known as static marks on the X-ray photograph. Or the substrate adsorbs dust or the like and exhibits the so-called dust marks. Particularly where the X-ray film is required to travel quickly as in the angiocardiographic apparatus, the aforementioned failures prominently arise. A known process proposed to prevent such difficulties consists in coating an antistatic agent on the surface of a plastic sheet. To preserve the originally intended properties of the substrate, however, it is necessary to apply extremely thin layers of the antistatic agent on the surface of a plastic sheet, which unavoidably renders said layer unendurable. Namely, where such thin layers of an antistatic agent are coated on the surface of the substrate, the agent is generally worn out easily due to repeated abrasion, washing with water, solvent, etc. or wiping and loses its antistatic effect in a relatively short time.

There is another known antistatic method which consists in incorporating an antistatic agent in the substrate or plastic sheet. However, since this method requires a large amount of antistatic agent to be mixed in order to assure the desired antistatic effect, it is handicapped by the fact that it is difficult to provide a substrate with a plain surface and the substrate is reduced in mechanical strength. Furthermore, a great deal of antistatic agent blended with the substrate obstructs the adhesion of a fluorescent layer to the substrate, presenting difficulties in manufacturing a fluorescent screen.

SUMMARY OF THE INVENTION

The antistatic fluorescent screen for radiography according to the present invention is prepared by laminating a layer of fluorescent material on a plastic substrate which mainly consists of plastics and contains 0.3 to 4.0 percent by weight of antistatic agent on the basis of the plastic material and 0.3 to 2.0 percent by weight of finely divided inorganic powders having a surface area of more than 400 m$^2$/g. so that the present fluorescent screen enables the plastic substrate thereof to retain its original properties and fully prevents said substrate from being statically charged without obstructing the adhesion between the plastic substrate and the fluorescent layer.

BRIEF EXPLANATION OF THE DRAWING

The drawing is a perspective view of an antistatic fluorescent radiation screen according to the present invention with a part broken away for better understanding of the construction.

DETAILED DESCRIPTION OF THE INVENTION

The plastics of which the substrate mainly consists include synthetic resins such as polystyrene series, polycarbonate, polyethylene terephthalate, polyethylene, polyvinyl chloride, etc. or cellulosic resins, such as cellulose acetate.

The antistatic agent used in the present invention may be suitably selected from among commercially available antistatic agents generally miscible with plastics, particularly from among those adapted for the quality of synthetic resins with which they are to be blended. The proportions of such antistatic agent preferably range between 0.3 and 4.0 percent by weight on the basis of the plastic material. Incorporation of less than 0.3 percent by weight of antistatic agent only displays an unsatisfactory antistatic effect, whereas more than 4.0 percent reduces the mechanical strength of the substrate and the adhesion of the plastic and fluorescent layers.

Finely divided inorganic powders used as an antistatic promoter (those having a surface area of more than 400m$^2$/g. are effective) should preferably consist of zeolite, silica gel, aluminum silicate, etc. which may be used singly or in combination. If mixed at the rate of from 0.3 percent to 2.0 percent by weight on the basis of the plastic material, these finely divided inorganic powders will give good results. If the particles used as an antistatic promoter are so selected as to have a surface area of more than 400m$^2$/g., a fluorescent screen prepared therefrom will increase in its antistatic effect. This effect is prominently displayed particularly when the screen is manufactured by the T-die process.

Where the substrate of a fluorescent screen consists of a plastic sheet, there may sometimes be incorporated white pigments such as titanium oxide in the plastic sheet to improve the sensitivity or external appearance of the screen or the sharpness of an image produced thereon. Or in addition to such white pigments, there may be used pigments or dyestuffs having other colors so as to render the screen image more distinct. Even use of appreciable amounts of these pigments or dyestuffs will not obstruct the antistatic effect of the fluorescent radiation screen of the present invention. However, if excess amounts of pigment in particular are incorporated, it will increase the absorption loss of radiation and so reduce the sensitivity of the screen. Accordingly, the content of pigment should preferably not exceed 10 percent, or more particularly 5 per cent.

The present invention will be more clearly appreciated by reference to the examples which follow. It will be understood, however, that they are offered only by way of illustration and are not intended to restrict the scope and breadth of the invention or limit the scope of the patent claims disclosed herein.

EXAMPLE 1

With "Diarex HT-500" (trade name for pelletized synthetic resin of styrene series manufactured by Mitsubishi Monsanto Chemical Company) were mixed the additives of Table 1 below in the proportions shown therein. After the mass was thoroughly admixed, there were prepared eight kinds of sample substrates 1 numbered from 1 to 8 each 60 cm. wide, and 0.3 mm. thick as shown in the drawing by the T-die process in accordance with the conventional practice.

Table 1

| Sample No. | Resin | Antistatic* Agent | Antistatic** Promoter | Titanium Oxide |
| --- | --- | --- | --- | --- |
| 1 | 100 | 0.5 | 1.0 | 2.0 |
| 2 | 100 | 1.0 | 0.5 | 0 |
| 3 | 100 | 2.0 | 1.0 | 3.0 |
| 4 | 100 | 3.0 | 2.0 | 7.0 |
| 5 | 100 | 2.0 | 1.0 | 12.0 |
| 6 | 100 | 2.0 | 0 | 3.0 |
| 7 | 100 | 0 | 1.0 | 3.0 |
| 8 | 100 | 2.0 | 1.0*** | 3.0 |

| Sample No. | Voltage of Static Charge (V) | |
| --- | --- | --- |
| | Right after Preparation | After washing |
| 1 | (+) 250 | (+) 600 |
| 2 | (+) 100 | (+) 400 |
| 3 | (+) 10 | (+) 250 |
| 4 | (+) 15 | (+) 280 |
| 5 | (+) 25 | (+) 400 |
| 6 | (+) 15 – 1,100 | (+) 2,100 |
| 7 | (+) 2,200 | (+) 2,300 |
| 8 | (+) 850 | (+) 2,000 |

Note:
(1) The proportions are by weight.
(2) Samples Nos. 6 to 8 are outside of the scope of the present invention.
(3) * Antistatic agent was "Electro-Striper-EA" (trade name, manufactured by KAO Soap Company)
** Antistatic promoter was Silica gel (having a surface area of 650m²/g. as measured by the BET method)
*** Fumy silica (having a surface area of 230m²/g. as measured by the BET method)

The antistatic effect of these sample substrates was respectively tested by the following method.

An iron bar 40 mm. in diameter and 1 kg. in weight was wrapped in a piece of gauze according to the Japanese pharmacopoeia. The surface of the sample substrate was rubbed 10 times with said wrapped iron bar. Immediately afterward, the voltage of the static charge generated was measured by a rotary sector-type electrometer (manufactured by Rion Company). For this measurement the sample substrate was treated at a temperature of 23° C. and relative humidity of 60 percent.

The results of measurement are presented in the left column of the heading "Voltage of Static Charge" of Table 1 above. Further to confirm the durability of the antistatic effect, the sample substrates were washed with a 1 percent solution of soapless soap and 7 days later, the voltage of static charge was determined in the same manner as described above, showing the results in the right column of said heading.

As apparent from the indicated results, the sample substrates Nos. 1 to 5 in which silica gel having a large surface area of more than 400 m²/g. was jointly used, with the antistatic agent displayed very minute amounts of static charge not only immediately following manufacture but also after washing. In contrast, sample No. 6 lacking silica gel was unstable in the antistatic effect, presented variations in the measured values, and remarkably decreased in said effect after washing. Sample No. 7 which only contained silica gel and lacked an antistatic agent was shown to have no antistatic effect. Neither had any antistatic effect sample No. 8 in which was incorporated silica gel having a small surface area, though it contained an antistatic agent.

Also the substrate of a fluorescent screen was prepared using as an antistatic promoter finely divided aluminum silicate powders having a surface area of 460 m²/g. in place of the silica gel of Table 1 above in the same proportions as indicated therein. Upon test, there were obtained substantially the same results as in the preceding example.

A fluorescent screen 2 was prepared using each of the aforesaid sample substrates 1. The manufacturing process consisted in coating one side of the substrate with a slurry formed by dispersing calcium tungstate phosphor in a solution of an organic solvent contained a binder. On the dried coating was disposed a fluorescent layer 3 and on said layer was further mounted a protective layer 4 made of cellulose diacetate film. Though not always indispensable, this protective layer affords better advantage in protecting the fluorescent screen.

After the fluorescent screens thus prepared were purposely rubbed in advance so as to be statically charged, they were tightly attached to an X-ray film. X-rays were irradiated thereon and the film was developed to find the presence of any failure of the screen caused by said static charge.

The X-ray films superposed on the fluorescent screens prepared from the sample substrates Nos. 6 to 8 exhibited near the edge portion a foggy appearance due to discharge. In contrast, the X-ray films attached to the fluorescent screens formed of the sample substrates Nos. 1 to 5 displayed no abnormalities.

The fluorescent screens prepared from the sample substrates Nos. 1 to 4 had the same sensitivity as the conventional product and the image produced thereon also had the same sharpness. However, the screen composed of the sample substrate No. 5 had a slightly lower sensitivity due to absorption of X-rays.

Example 2

As shown in Table 2 below, with "TOPOREX-825E" (trade name for pelletized high-impact polystyrene manufactured by Toyo Koatsu Company) were admixed "CATANAC LSA" (trade name, manufactured by American Cyanamid Company) as an antistatic agent and "MOLECULAR SIEVES-13X" (trade name for synthetic zeolite manufactured by Linde Company, Division of Union Carbide Corporation) as an antistatic promoter. From the aforementioned materials were prepared seven kinds of sample substrates numbered from 1 to 7 each 60 cm. wide and 0.5 mm. thick by the T-die process in accordance with the conventional practice. Note:
(1) The proportions are by weight.
(2) Samples Nos. 5 to 7 are outside of the scope of the present invention.
(3) * Antistatic agent was "CATANAC LSA" (trade name, manufactured by American Cyanamid Company)
** Antistatic promoter was "MOLECULAR SIEVES" (trade name, manufactured by Linde Company) having a surface are of 800 m²/g. as measured by the BET method.
*** Natural zeolite powders having a surface area of 320 m²/g. as measured by the BET method.

The voltage of static charge accumulated in the sample fluorescent screens was measured in the same manner as in Example 4 so as to investigate their antistatic effect. Samples Nos. 1 to 4 exhibited an excellent antistatic effect. Namely, they fully preserved this effect even seven days after washing. Sample No. 5 containing no antistatic promoter was unstable in the antistatic effect and displayed considerable variations in the measured value of the voltage of static charge and sharply decreased in said effect after washing as was the case with the similar substrate No. 6 of Example 1.

Further, sample No. 6 which only contained an antistatic promoter exhibited no antistatic effect. It was also confirmed that sample No. 7 in which was incorporated an antistatic promoter having a small surface area presented no antistatic effect, though it contained an antistatic agent.

Fluorescent screens were prepared from these sample substrates Nos. 1 to 7, and the extent of harmful effects which these screens would exert on the X-ray films attached thereto were investigated in the same manner as in Example 1.

The fluorescent screens using the sample substrates Nos. 1 to 4 were shown to have no harmful effect on the X-ray film, whereas the screens prepared from the sample substrates Nos. 5 to 7 produced a foggy appearance on the X-ray film due to the discharge of static energy accumulated therein. The screen formed of the sample substrate No. 4 exhibited a slightly reduced sensitivity due to absorption of X-rays.

The foregoing examples used a fluorescent screen prepared by directly superposing a fluorescent layer on a substrate. However, a fluorescent screen formed by first coating a light-absorbing layer on one side of the substrate and then mounting a fluorescent layer thereon was also recognized to give the same results.

For a high sharpness screen, the light absorbing layer was prepared from thin layers of red or yellow pigment, and for a high sensitivity screen from thin layers of white pigment, for example, titanium oxide so as to elevate the sensitivity of the screen by reflection of a fluorescent light.

In either case, the light absorbing layer is formed by coating one side of a substrate with a slurry consisting of a dispersed mixture of a suitable binder, organic solvent and pigment, followed by drying.

As mentioned above, the antistatic fluorescent screen of the present invention is formed of a plastic substrate treated for prevention of a static charge and completely eliminates obstructions to the X-ray photography resulting from such charge. Moreover, the present invention fully prevents the plastic substrate of a fluorescent screen from loss of its excellent original properties, so that the screen as a whole is not reduced in durability.

The perfection of the present invention has made it possible to utilize a large variety of plastics, which have hitherto presented difficulties due to their readiness to be statically charged, favorably in the substrate of a fluorescent radiation screen, drawing upon their mechanical and chemical properties.

We claim:

1. An antistatic fluorescent screen for radiography comprising a plastic substrate containing therein an antistatic agent and finely divided inorganic powders having a surface area of more than 400m$^2$/g., said antistatic agent and said inorganic powders being 0.3 to 4.0 percent by weight and 0.3 to 2.0 percent by weight on the basis of the plastic, and a laminated fluorescent layer on said plastic substrate.

2. An antistatic fluorescent screen according to claim 1, wherein the finely divided inorganic powders comprise at least one of the group consisting of zeolite, silica gel, and aluminum silicate.